(12) United States Patent
Kim et al.

(10) Patent No.: US 9,396,108 B2
(45) Date of Patent: Jul. 19, 2016

(54) DATA STORAGE DEVICE CAPABLE OF EFFICIENTLY USING A WORKING MEMORY DEVICE

(71) Applicant: SK hynix Inc., Gyeonggi-do (KR)

(72) Inventors: Hyun Jun Kim, Gyeonggi-do (KR); Kyeong Rho Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 148 days.

(21) Appl. No.: 14/158,527

(22) Filed: Jan. 17, 2014

(65) Prior Publication Data

US 2015/0134886 A1    May 14, 2015

(30) Foreign Application Priority Data

Nov. 13, 2013  (KR) .................... 10-2013-0137737

(51) Int. Cl.
*G06F 12/00* (2006.01)
*G06F 3/06* (2006.01)
*G06F 12/02* (2006.01)
*G06F 12/08* (2016.01)

(52) U.S. Cl.
CPC ............ *G06F 12/0246* (2013.01); *G06F 3/061* (2013.01); *G06F 3/0656* (2013.01); *G06F 3/0688* (2013.01); *G06F 12/0238* (2013.01); *G06F 12/0871* (2013.01); *G06F 2003/0695* (2013.01); *G06F 2212/1044* (2013.01); *G06F 2212/282* (2013.01); *G06F 2212/601* (2013.01); *G06F 2212/7203* (2013.01); *G06F 2212/7204* (2013.01)

(58) Field of Classification Search
CPC ..... G06F 3/061; G06F 3/0656; G06F 3/0688; G06F 12/0246; G06F 12/0238; G06F 12/0871; G06F 2212/281; G06F 2212/601; G06F 2212/1044; G06F 2212/7204; G06F 2212/7203
See application file for complete search history.

(56) References Cited

U.S. PATENT DOCUMENTS

| | | | |
|---|---|---|---|
| 2010/0174860 A1* | 7/2010 | Kim | 711/112 |
| 2012/0246392 A1* | 9/2012 | Cheon | 711/103 |
| 2014/0156964 A1* | 6/2014 | Choi | 711/171 |

FOREIGN PATENT DOCUMENTS

KR    1020120108339    10/2012

* cited by examiner

*Primary Examiner* — Aracelis Ruiz
(74) *Attorney, Agent, or Firm* — IP & T Group LLP

(57) ABSTRACT

A data storage device includes a first memory device, a second memory device including a system region and a buffer region and a controller suitable for controlling the first memory device in response to a request from a host device, and allocating the system region and the buffer region according to an attribute of data involved with the request from the host device.

6 Claims, 10 Drawing Sheets

FIG.5

S_RRN : Number of sequential data request
R_RRN : Number of random data request

| S_RRN | R_RRN |
|---|---|
| 15 | 10 |

+

| Random data request determined in S220 |
|---|
| 1 |

⇩ Update (S230)

| S_RRN | R_RRN |
|---|---|
| 15 | 11 |

DATA STORAGE DEVICE CAPABLE OF EFFICIENTLY USING A WORKING MEMORY DEVICE

CROSS-REFERENCES TO RELATED APPLICATION

The present application claims priority under 35 U.S.C. §119(a) to Korean application number 10-2013-0137737, filed on Nov. 13, 2013, in the Korean Intellectual Property Office, which is incorporated herein by reference in its entirety.

BACKGROUND

1. Technical Field

Various exemplary embodiments relate to a data storage device, and more particularly, to a data storage device capable of efficiently using a memory device.

2. Related Art

Recent paradigm of the computing environment became ubiquitous computing so that computer systems can be used anytime and anywhere. The ubiquitous computing environment increases the use of portable electronic devices such as mobile phones, digital cameras, and laptop computers. Such portable electronic device uses a data storage device, which includes a memory device, as a main memory device or an auxiliary memory device.

It is advantageous that the data storage apparatus including the memory device has excellent stability and endurance because they have no mechanical driving units. The data storage apparatus has very fast information access speed and relatively low power consumption. The data storage devices having such advantages include a USB (universal serial bus) memory device, a memory card having various interfaces, and a solid state drive (SSD).

The data storage device may use a buffer program scheme to secure a high operation speed. For example, the data storage device may temporarily store data provided from a host device to the memory device of the data storage device. During an idle time, the data temporarily stored in the memory device may be stored in the nonvolatile memory device of the data storage device.

The host device that accesses the data storage device provides a logical address to the data storage device. The data storage device converts the logical address into a physical address used in the data storage device and performs a requested operation based on the physical address. For such an address converting operation, the data storage device may manage an address mapping table. The address mapping table may be loaded on the memory device of the data storage device.

For this reason, the data storage device needs a working memory device with large storage capacity. However, the storage capacity of the working memory device has a trade-off relationship with a manufacturing cost.

SUMMARY

A data storage device capable of efficiently using a memory device thereof is described herein.

In an embodiment of the present disclosure, a data storage device may include a first memory device, a second memory device including a system region and a buffer region, and a controller suitable for controlling the first memory device in response to a request from a host device, and allocating the system region and the buffer region according to an attribute of data involved with the request from the host device.

In an embodiment of the present disclosure, a data storage device may include a first memory device, a second memory device including a system region and a buffer region, and a controller including a third memory device, and suitable for storing data in the first memory device or provide data read from the first memory device to a host device according to a request from the host device, and varying sizes of the system region and the buffer region according to an attribute of data involved with the request from the host device.

In an embodiment of the present disclosure, a data storage device may include a first memory device, a second memory device including a system region and a buffer region, and a controller suitable for controlling the first memory device in response to a request from a host device, cumulatively managing an attribute of data involved with the request from the host device and allocating the system region and the buffer region according to the cumulatively managed attribute of data.

In an embodiment of the present disclosure, a storage device may include a storage, a flexible memory region, and a controller suitable for controlling the storage in response to an external request and allocating the flexible memory region to each of a first dedicated memory region and a second dedicated memory region, wherein the controller determines respective allocation portions of the flexible memory region to the first dedicated memory region and the second dedicated memory region based on an attribute of data involved with the external request.

According to the embodiments of the present disclosure, the memory device of a data storage device may be efficiently used, and the operating speed of the data storage device may be improved.

BRIEF DESCRIPTION OF THE DRAWINGS

Features, aspects, and embodiments are described in conjunction with the attached drawings, in which:

FIG. 5 is a chart illustrating the operation of the data storage device shown in FIG. 4;

DETAILED DESCRIPTION

Figure 1:
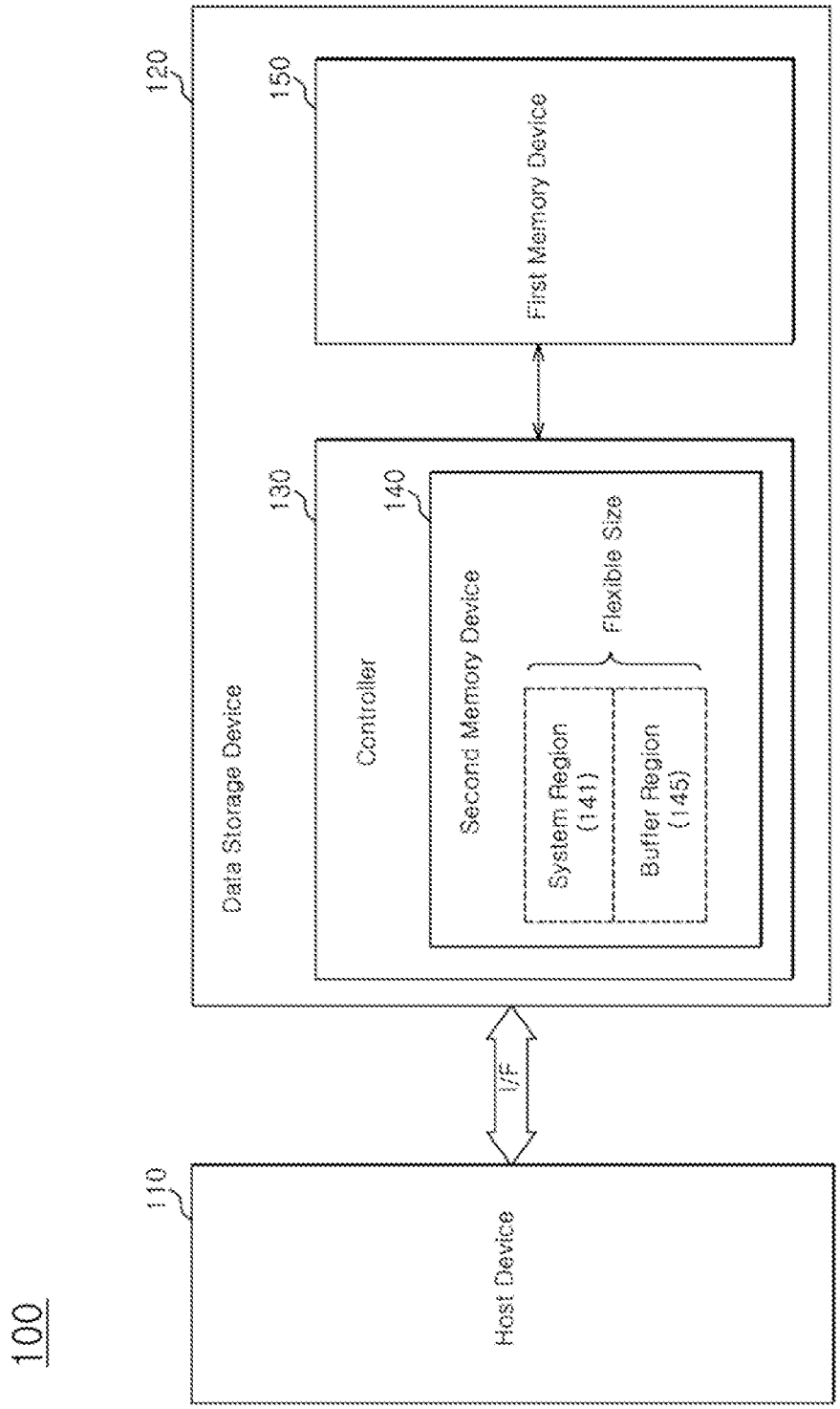
FIG. 1 is a block diagram exemplarily illustrating a data processing system including a data storage device in accordance with an embodiment of the present disclosure.

In the present disclosure, advantages, features, and methods for achieving them will become more apparent after reading the following exemplary embodiments taken in conjunction with the drawings. The present disclosure may, however, be embodied in different forms and should not be construed as being limited to the embodiments set forth herein. Rather, these embodiments are provided to describe the present disclosure in detail to the extent that a person skilled in the art to which the disclosure pertains can easily enforce the technical concept of the present disclosure.

It is to be understood herein that embodiments of the present disclosure are not limited to the particulars shown in the drawings and that the drawings are not necessarily to scale and in some instances proportions may have been exaggerated in order to more clearly depict certain features of the disclosure. While particular terminology is used herein, it is to be appreciated that the terminology used herein is for the purpose of describing particular embodiments only and is not intended to limit the scope of the present disclosure.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, a data storage device according to the present disclosure will be described below with reference to the accompanying drawings through exemplary embodiments.

FIG. 1 is a block diagram illustrating a data processing system including a data storage device in accordance with an embodiment of the present disclosure.

Figure 2:
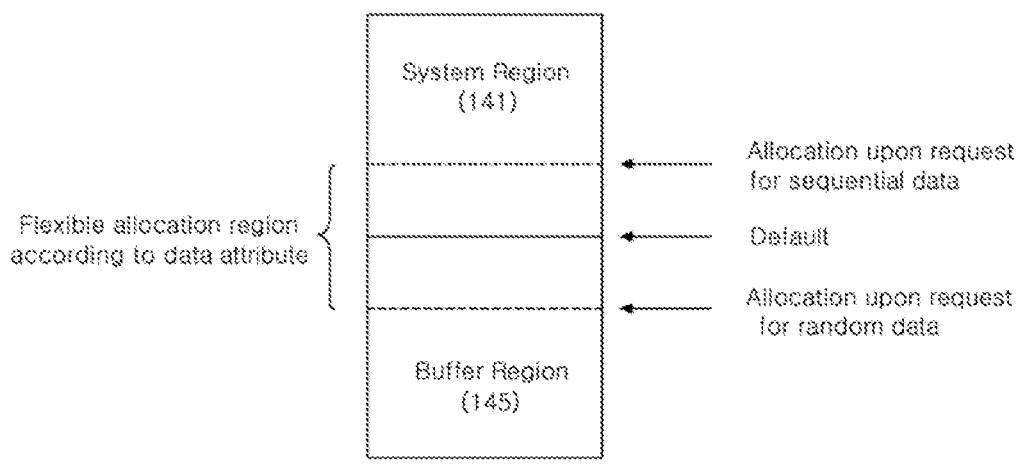
FIG. 2 is a block diagram of a second memory device shown in FIG. 1 illustrating a region allocation of the memory device of the data storage device in accordance with the embodiment of the present disclosure.

FIG. 2 is a block diagram of a second memory device shown in FIG. 1 illustrating a region allocation of the memory device of the data storage device in accordance with the embodiment of the present disclosure.

Referring to FIG. 1, the data processing system 100 may include a host device 110 and a data storage device 120.

For instance, the host device 110 may be a portable electronic device such as a mobile phone, an MP3 player, a digital camera, and a laptop or an electronic device such as a desktop computer, a game player, a TV, a beam projector, and an in-vehicle infotainment system.

The data storage device 120 may operate in response to a request from the host device 110. The data storage device 120 may store data to be accessed by the host device 110. That is to say, the data storage device 120 may be used as the memory device of the host device 110. The data storage device 120 may also be referred to as a memory system. The data storage device 120 may be constituted by a memory card or a solid state drive (SSD). The data storage device 120 may be electrically coupled with the host device 110 through various interfaces.

The data storage device 120 may include a controller 130, a first memory device 150, and a second memory device 140. While FIG. 1 shows the second memory device 140 inside the controller 130 as an example, the second memory device 140 may be disposed outside of the controller 130.

The controller 130 may control operations of the data storage device 120. The controller 130 may drive firmware or software for controlling the operations of the data storage device 120. The controller 130 may drive the firmware or the software that is loaded on the second memory device 140.

The second memory device 140 may include one or more of nonvolatile memory devices such as a static random access memory device (SRAM) and a dynamic random access memory device (DRAM). The second memory device 140 may include one or more of various types of nonvolatile memory devices such as a ferroelectric random access memory (FRAM) using a ferroelectric capacitor, a magnetic random access (MRAM) using a tunneling magneto-resistive (TMR) layer, a phase change random access memory (PCRAM) using a chalcogenide alloy and a resistive random access memory (ReRAM) using a transition metal oxide.

The second memory device 140 may include a system region 141 and a buffer region 145. Through such a region allocation, the second memory device 140 may be used as a working memory region necessary for driving the controller 130 and may be used as a buffer or cache memory region for improving a data transmission speed. For instance, a firmware to be driven by the controller 130 and data necessary for driving the firmware may be stored in or loaded on the system region 141 and data to be transferred between the host device 110 and the first memory device 150 may be temporarily stored in the buffer region 145. The data to be transmitted from the host device 110 to the first memory device 150 may be temporarily stored in the buffer region 145, and then, may be moved from the buffer region 145 to the first memory device 150 during the idle time of the data storage device 120.

The first memory device 150 may serve as a storage medium of the data storage device 120. The first memory device 150 may include one or more or combination of various types of nonvolatile memory devices such as a NAND type flash memory device, a NOR type flash memory device, the FRAM, the MRAM, the PCRAM, and the ReRAM.

The first memory device 150 may perform a read or a program operation by the unit of a page according to its structure. The first memory device 150 may perform an erase operation by the unit of a block according to its structure. Stored data in a memory cell of the first memory device 150 may be erased for the memory cell to store new data. Because of such characteristics of the first memory device 150, the controller 130 may drive additional firmware or additional software that is referred to as a flash translation layer (FTL).

The controller 130 may manage the read, program and erase operations of the first memory device 150 such that the data storage device 120 may operate in response to an access request, for example, the read or write operation, from a file system of the host device 110. Further, the controller 130 may manage additional operations, such as garbage collecting operation, wear-leveling operation, and bad block managing operation.

When the host device 110 accesses the data storage device 120 or requests the read or write operation of the data storage device 120, for example, the host device 110 may provide a logical address to the data storage device 120. The controller 130 may convert the provided logical address into a physical address of the first memory device 150 and perform the requested operation by referring to the converted physical address. For such an address converting operation, the controller 130 may manage address conversion data, that is, an address mapping table.

If the respective sizes of the system region 141 and the buffer region 145 of the second memory device 140 may be flexible according to attribute of the data involved with the requested operation, the operating speed of the controller 130 and the data storage device 120 may be increased.

For example, when the host device 110 requests non-sequential data (hereinafter, referred to as random data), the controller 130 may frequently perform the management operations due to the characteristics of the first memory device 150 as described above to process the random data. Also, the controller 130 may frequently refer to the address mapping table to process the random data. This means that the size of the firmware to be driven for the controller 130 to process the random data and the size of data necessary for driving the firmware may be increased. When the host device 110 requests random data, the operating speed of the data storage device 120 may be increased as the size of data to be stored in or loaded on the second memory device 140, that is, the size of the firmware and the data necessary for driving the firmware increases.

For another example, when the host device 110 requests sequential data, the controller 130 may less frequently perform the management operations due to the characteristics of the first memory device 150 as described above to process the sequential data. Also, the controller 130 may less frequently refer to the address mapping table to process the sequential data. This means that the size of a firmware to be driven for the controller 130 to process the sequential data and the size of data necessary for driving the firmware may be decreased. Instead, the controller 130 may need a buffer or cache memory region to quickly process the sequential data and improve a data transmission speed. When the host device 110 requests the sequential data, the operating speed of the data storage device 120 may be increased as the amount of data to be transmitted from the host device 110 and temporarily stored in the second memory device 140 or the amount of data to be transmitted from the first memory device 150 increases.

According to the embodiment of the present disclosure, each size of the system region 141 and the buffer region 145 of the second memory device 140 may be varied according to the attributes of the data involved with the requested operation. Namely, as shown in FIG. 2, the allocation of the regions of the second memory device 140 may be varied according to the attribute of the data requested from the host device 110. According to the embodiment of the present disclosure, the second memory device 140 may have a flexible allocation region as well as the system region 141 and the buffer region 145. The flexible allocation region may be flexibly allocated for the system region 141 and the buffer region 145 according to the data requested from the host device 110. For instance, when the host device 110 requests the sequential data, memory space in the flexible allocation region may be allocated more for the buffer region 145 than the system region 141, and thus the size of the system region 141 may be decreased while the size of the buffer region 145 may be increased. For another instance, when the host device 110 requests random data, memory space in the flexible allocation region may be allocated more for the system region 141 than the buffer region 145, and thus the size of the system region 141 may be increased while the size of the buffer region 145 may be decreased.

Figure 3:
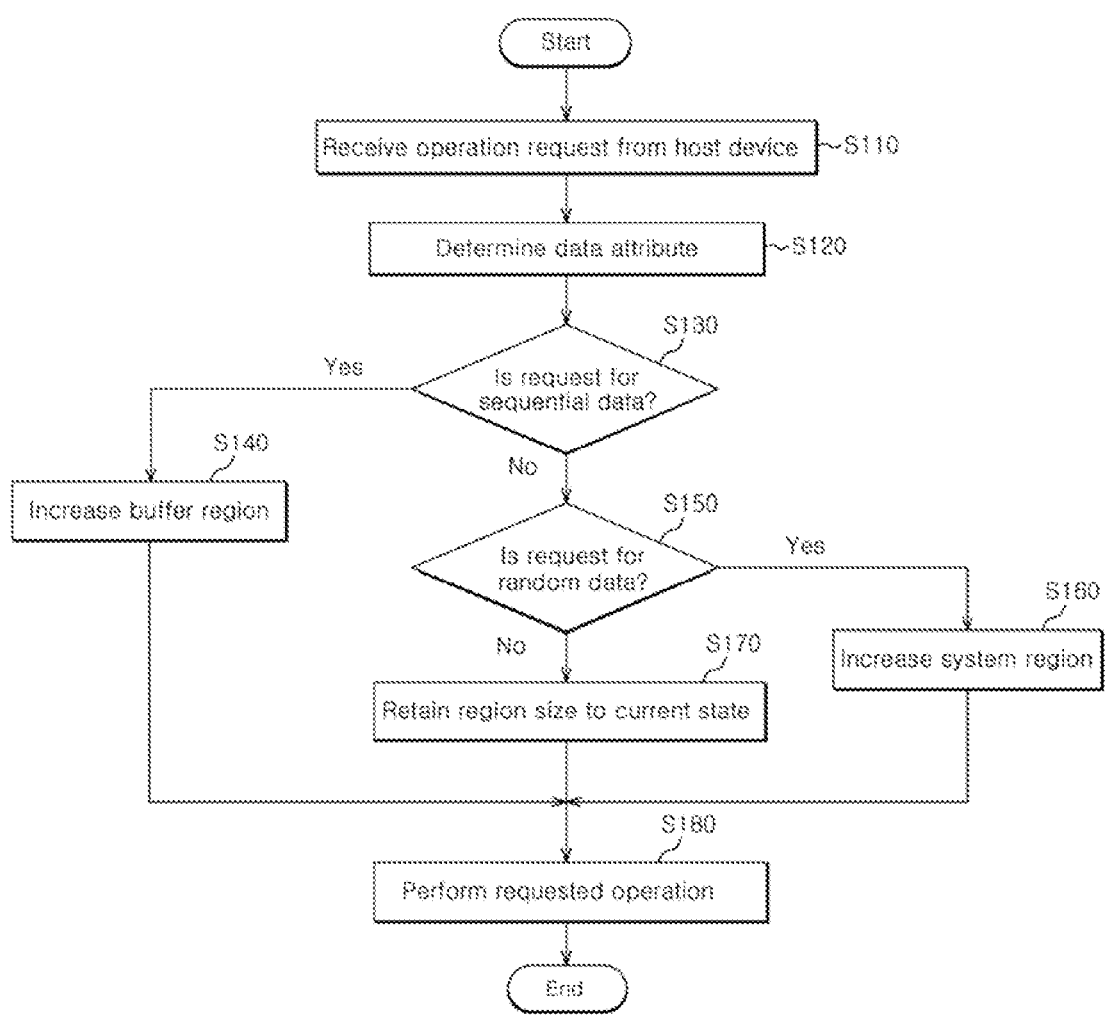
FIG. 3 is a flow chart illustrating an operation of the data storage device in accordance with an embodiment of the present disclosure.

FIG. 3 is a flow chart illustrating an operation of the data storage device in accordance with an embodiment of the present disclosure. With reference to FIGS. 1 and 3, the operation of the second memory device 140 of the data storage device 120 will be described in detail.

In step S110, the controller 130 may receive an operation request from the host device 110. For example, the controller 130 may receive a data read request from the host device 110. In this case, the controller 130 may receive an address for stored data to be read as well as the data read request. For another example, the controller 130 may receive a data write request from the host device 110. In this case, the controller 130 may receive data and an address for the data to be stored as well as the write request.

In step S120, the controller 130 may determine the attribute of the data access-requested from the host device 110. For example, when the read request is received from the host device 110, the controller 130 may determine the attribute of the data based on the received address. The controller 130 may determine the read-requested data as the sequential data when the size of the read-requested address is larger than or equal to an attribute determination reference value. The controller 130 may determine the read-requested data as the random data when the size of the read-requested address is smaller than the attribute determination reference value. For another example, when the write request is received from the host device 110, the controller 130 may determine the attribute of the data based on the write-requested address or the write-requested data. The controller 130 may determine the write-requested data as the sequential data when the size of the write-requested address or data is larger than or equal to the attribute determination reference value. The controller 130 may determine the write-requested data as the random data when the size of the write-requested address or data is smaller than the attribute determination reference value.

In step S130, the controller 130 may determine whether or not the host device 110 has requested the sequential data. When it is determined that the host device 110 has requested sequential data, the process may proceed to step S140. In the step S140, the controller 130 may increase the buffer region 145 of the second memory device 140 as described with reference to FIG. 2.

When it is determined that the host device 110 has not requested sequential data, the process may proceed to step S150. In the step S150, the controller 130 may determine whether or not the host device 110 has requested the random data. When it is determined that the host device 110 has requested the random data, the process may proceed to step S160. In the step S160, the controller 130 may increase the system region 141 of the second memory device 140 as described with reference to FIG. 2.

When it is determined that the host device 110 has not requested the random data, the process may proceed to step S170. In the step S170, the controller 130 may retain the current sizes of the system region 141 and the buffer region 145 of the second memory device 140.

In step S180, the controller 130 may complete the allocation of the regions of the second memory device 140 according to the attribute of the data requested from the host device 110 and may perform the operation requested from the host device 110.

Figure 4:
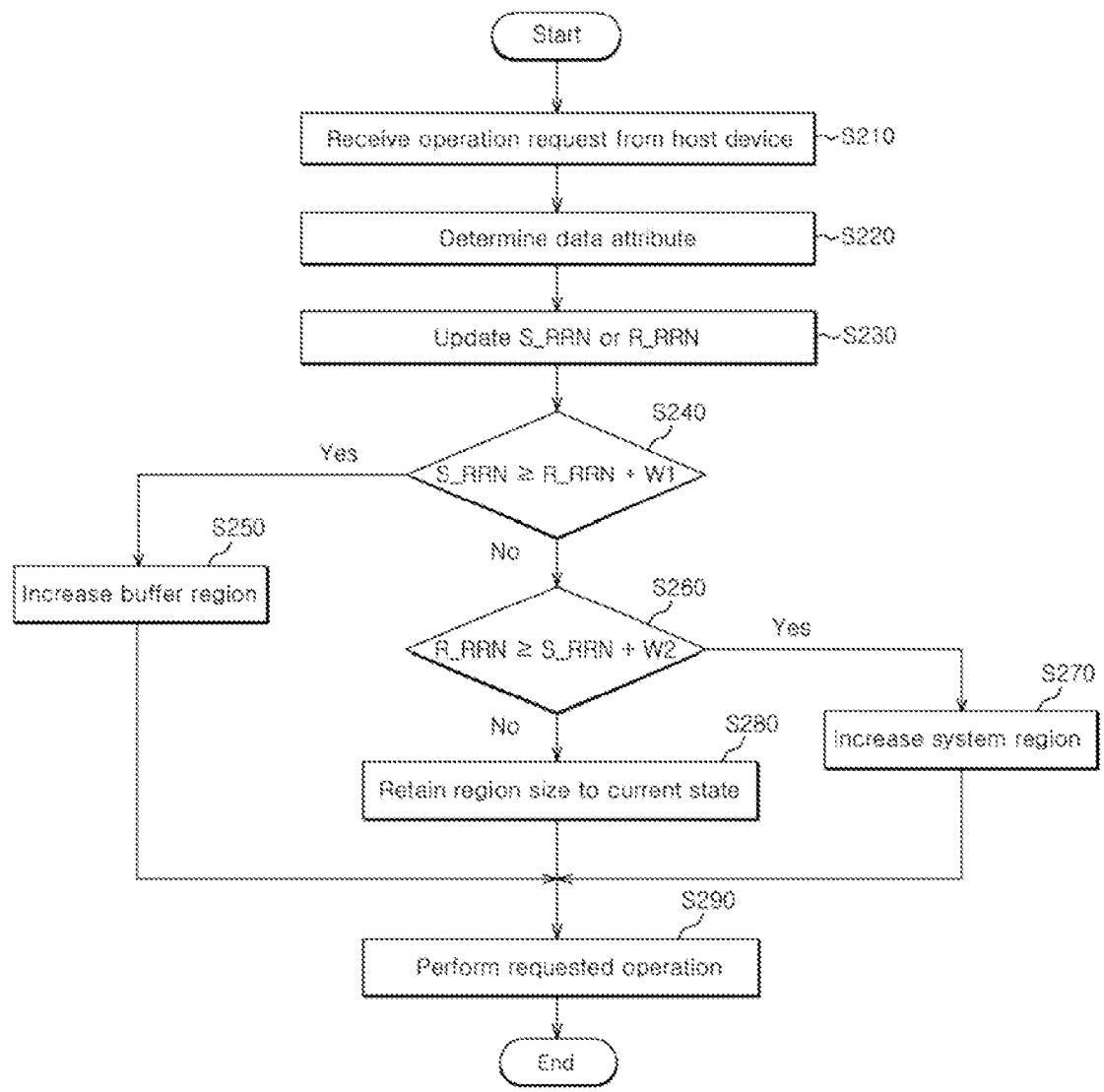
FIG. 4 is a flow chart illustrating an operation of the data storage device in accordance with an embodiment of the present disclosure.

FIG. 4 is a flow chart illustrating an operation of the data storage device in accordance with an embodiment of the present disclosure. FIG. 5 is a chart illustrating the operation of the data storage device shown in FIG. 4. With reference to FIGS. 1, 4 and 5, a region allocating method of the first memory device 140 of the data storage device 120 will be described in detail.

In step S210, the controller 130 may receive an operation request from the host device 110. For example, the controller 130 may receive a data read request from the host device 110. In this case, the controller 130 may receive an address for the stored data to be read as well as the read request. For another example, the controller 130 may receive a data write request from the host device 110. In this case, the controller 130 may receive data and an address for the data to be stored as well as the write request.

In step S220, the controller 130 may determine the attribute of the data access-requested from the host device 110. For example, when the read request is received from the host device 110, the controller 130 may determine the attribute of the data based on the received address. The controller 130 may determine the read-requested data as the sequential data when the size of the read-requested address is larger than or equal to an attribute determination reference value. The controller 130 may determine the read-requested data as the random data when the size of the read-requested address is smaller than the attribute determination reference value. For another example, when the write request is received from the host device 110, the controller 130 may determine the attribute of the data based on the write-requested address or the write-requested data. The controller 130 may determine the write-requested data as the sequential data when the size of the write-requested address or data is larger than or equal to the attribute determination reference value. The controller 130 may determine the write-requested data as the random data when the size of the write-requested address or data is smaller than the attribute determination reference value.

In step S230, the controller 130 may cumulatively manage the attribute of recently requested data. In other words, as shown in FIG. 5, the controller 130 may respectively and cumulatively manage a number of times S_RRN by which the host device 110 has requested sequential data and a number of times R_RRN by which the host device 110 has requested random data. The controller 130 may update the number S_RRN of the sequential data requests or the number R_RRN of the random data requests based on the determination of the attribute of the access-requested data at step S220. As a result, the controller 130 may manage a number of the sequential data requests S_RRN and a number of the random data requests R_RRN.

In step S240, the controller 130 may determine whether or not the number of the sequential data requests S_RRN is larger than or equal to a weight W1 plus the number of the random data requests R_RRN. The weight W1 may be a value for controlling allocation of the memory space in the flexible allocation region shown in FIG. 2 for the system region 141 and the buffer region 145. For example, in order to allocate more of the memory space in the flexible allocation region for the buffer region 145 than the system region 141, the weight W1 may be set small.

When it is determined that the number of the sequential data requests S_RRN is larger than or equal to the weight W1 plus the number of the random data requests R_RRN, the process may proceed to step S250. In the step S250, the controller 130 may increase the buffer region 145 of the second memory device 140 as described with reference to FIG. 2.

When it is determined that the number of the sequential data requests S_RRN is smaller than the weight W1 plus the number of the random data requests R_RRN, the process may proceed to step S260. In the step S260, the controller 130 may determine whether or not the number of the random data requests R_RRN is larger than or equal to a weight W2 plus the number of the sequential data requests S_RRN. The weight W2 may be a value for controlling allocation of the memory space in the flexible allocation region shown in FIG. 2 for the system region 141 and the buffer region 145. For example, in order to allocate more of the memory space in the flexible allocation region for the system region 141 than the buffer region 145, the weight W2 may be set small.

When it is determined that the number of the random data requests R_RRN is larger than or equal to the weight W2 plus the number of the sequential data requests S_RRN, the process may proceed to step S270. In the step S270, the controller 130 may increase the system region 141 of the second memory device 140 as described with reference to FIG. 2.

When it is determined that the number of the random data requests R_RRN is smaller than the weight W2 plus the number of the sequential data requests S_RRN, the process may proceed to step S280. In the step S280, the controller 130 may retain the current sizes of the system region 141 and the buffer region 145 of the second memory device 140.

In the step S290, the controller 130 may complete the allocation of the regions of the second memory device 140 according to the cumulated value of the attribute of the data requested from the host device 110, and may perform the operation requested from the host device 110.

Figure 6:
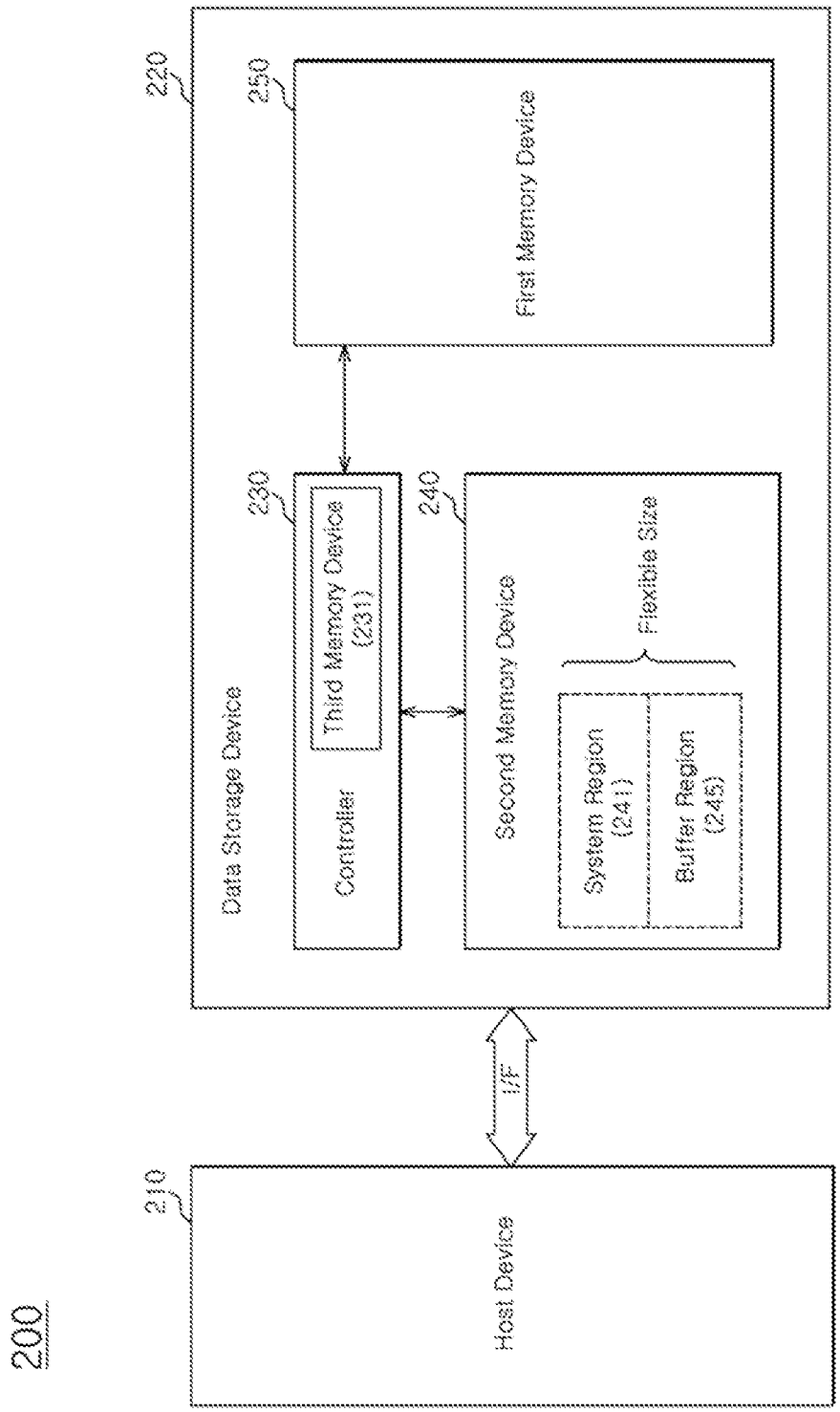
FIG. 6 is a block diagram illustrating a data processing system including a data storage device in accordance with an embodiment of the present disclosure.

FIG. 6 is a block diagram illustrating a data processing system including a data storage device in accordance with an embodiment of the present disclosure.

Referring to FIG. 6, a data processing system 200 may include a host device 210 and a data storage device 220. The hose device 210 may be the same as the host device 110 described with reference to FIGS. 1 to 5.

The data storage device 220 may store data to be accessed by the host device 210. The data storage device 220 may also be referred to as a memory system. The data storage device 220 may be constituted by a memory card. The data storage device 220 may be constituted by a solid state drive (SSD). The data storage device 220 may be electrically coupled with the host device 210 through various interfaces.

The data storage device 220 may include a controller 230, a first memory device 250, a second memory device 240, and a third memory device 231. While FIG. 6 shows the second memory device 240 inside the controller 230, the second memory device 240 may be physically arranged outside the controller 230.

The controller 230 may be the same as the controller 130 described with reference to FIGS. 1 to 5 except that the controller 230 may include the third memory device 231. The third memory device 231 may serve as a working memory device of the controller 230. That is to say, the controller 230 may drive the firmware or the software, which is loaded on the third memory device 231.

The third memory device 231 may include one or more of nonvolatile memory devices such as a static random access memory device (SRAM) and a dynamic random access memory device (DRAM).

The second memory device 240 may be the same as the second memory device 140 described with reference to FIGS. 1 to 5.

The first memory device 250 may be the same as the first memory device 150 described with reference to FIGS. 1 to 5.

According to the embodiment of the present disclosure, the sizes of the system region 241 and the buffer region 245 of the second memory device 240 may be varied according to the attributes of the data requested (for example, read-requested and write-requested) from the host device 210. As described with reference to FIG. 2, the allocation of the regions of the second memory device 240 may be varied according to the attribute of the data requested from the host device 210. According to the embodiment of the present disclosure, the second memory device 240 may have the flexible allocation region as well as the system region 241 and the buffer region 245. The flexible allocation region may be flexibly allocated for the system region 241 and the buffer region 245 according to the data requested from the host device 210. For instance, when the host device 210 requests the sequential data, more of memory space in the flexible allocation region may be allocated for the buffer region 245 than the system region 241 and thus the size of the system region 241 may be decreased while the size of the buffer region 245 may be increased. For another instance, when the host device 210 requests random data, more of memory space in the flexible allocation region may be allocated for the system region 241 than the buffer region 245, and thus the size of the system region 241 may be increased while the size of the buffer region 245 may be decreased.

Figure 7:
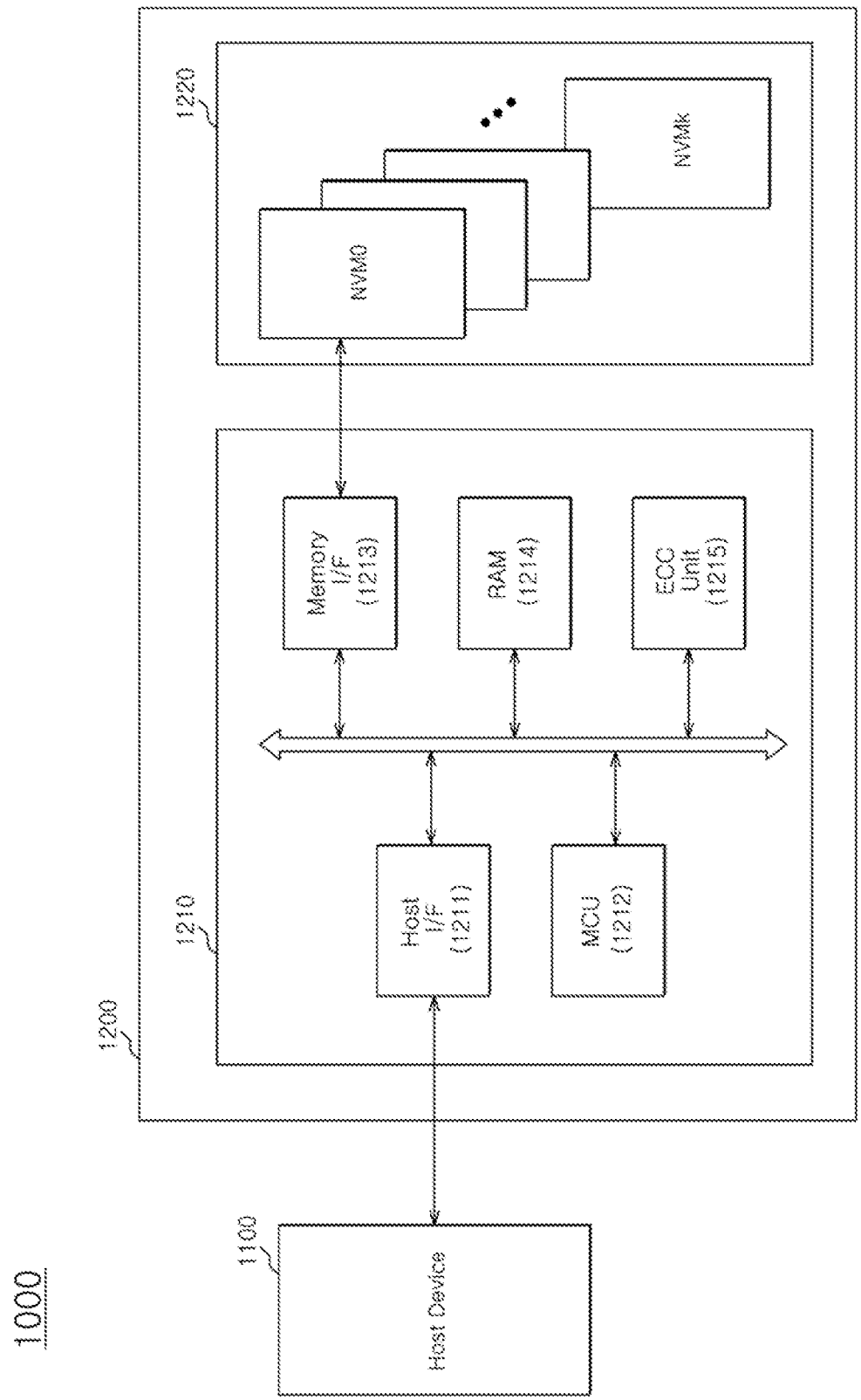
FIG. 7 is a block diagram illustrating a data processing system in accordance with an embodiment of the present disclosure.

FIG. 7 is a block diagram illustrating a data processing system in accordance with an embodiment of the present disclosure.

Referring to FIG. 7, a data processing system 1000 may include a host 1100 and a data storage device 1200. The data storage device 1200 may include a controller 1210 and a nonvolatile memory device 1220. The data storage device 1200 may be used by being electrically coupled to the host 1100 such as a desktop computer, a notebook computer, a digital camera, a mobile phone, an MP3 player, a game player, and so forth. The data storage device 1200 may also be referred to as a memory system.

The controller 1210 may access the nonvolatile memory device 1220 in response to a request from the host 1100. For example, the controller 1210 may control the read, program, or erase operation of the nonvolatile memory device 1220. The controller 1210 may drive firmware or software for controlling the nonvolatile memory device 1220.

The controller 1210 may include a host interface 1211, a micro control unit 1212, a memory interface 1213, a RAM 1214, and an error correction code (ECC) unit 1215.

The micro control unit 1212 may control the operations of the controller 1210 in response to a request from the host 1100. The RAM 1214 may serve as the working memory of the micro control unit 1212. The RAM 1214 may temporarily store the data read from the nonvolatile memory device 1220 or the data provided from the host 1100.

The micro control unit 1212 may vary the size of the system region and the buffer region (not shown) of the RAM 1214 according to the attribute of the access-requested data from the host 1100.

According to the embodiment of the present disclosure, each size of the system region and the buffer region of the RAM 1214 may be varied by the micro control unit 1212 according to the attributes of the data involved with the requested operation. As shown in FIG. 2, the allocation of the regions of the RAM 1214 may be varied according to the attribute of the data requested from the host 1100. According to the embodiment of the present disclosure, the RAM 1214 may have the flexible allocation region as well as the system region and the buffer region. The flexible allocation region may be flexibly allocated for the system region and the buffer region by the micro control unit 1212 according to the data requested from the host 1100. For instance, when the host 1100 requests the sequential data, more of memory space in the flexible allocation region may be allocated for the buffer region than the system region by the micro control unit 1212, and thus the size of the system region may be decreased while the size of the buffer region may be increased. For another instance, when the host 1100 requests the random data, more of memory space in the flexible allocation region may be allocated for the system region than the buffer region by the micro control unit 1212, and thus the size of the system region may be increased while the size of the buffer region may be decreased.

The host interface 1211 may interface the host 1100 and the controller 1210. For example, the host interface 1211 may communicate with the host 1100 through one of various interface protocols such as a universal serial bus (USB) protocol, a universal flash storage (UFS) protocol, a multimedia card (MMC) protocol, a peripheral component interconnection (PCI) protocol, a PCI express (PCI-E) protocol, a parallel advanced technology attachment (PATA) protocol, a serial advanced technology attachment (SATA) protocol, a small computer system interface (SCSI) protocol, and a serial attached SCSI (SAS) protocol.

The memory interface 1213 may interface the controller 1210 and the nonvolatile memory device 1220. The memory interface 1213 may provide a command and an address to the nonvolatile memory device 1220. Furthermore, the memory interface 1213 may exchange data with the nonvolatile memory device 1220.

The error correction code unit 1215 may detect an error of the data read from the nonvolatile memory device 1220. Also, the error correction code unit 1215 may correct the detected error when the detected error falls within a correctable range. Meanwhile, the error correction code unit 1215 may be provided inside or outside the controller 1210 according to the memory system 1000.

The controller 1210 and the nonvolatile memory device 1220 may be integrated into one semiconductor device and may be configured as a memory device. For example, the controller 1210 and the nonvolatile memory device 1220 may be integrated into one semiconductor apparatus and may be configured as a personal computer memory card international association (PCMCIA) card, a compact flash (CF) card, a smart media card, a memory stick, a multimedia card in the form of an MMC, an eMMC, an RS-MMC and a micro-MMC, a secure digital card in the form of an SD, a mini-SD and an micro-SD, and a universal flash storage (UFS) device.

In another embodiment, the controller 1210 or the nonvolatile memory device 1220 may be mounted to various types of packages. For example, the controller 1210 or the nonvolatile memory device 1220 may be mounted by being packaged into types such as a package-on-package (POP), a system-in-package (SIP), a system-on-chip (SOC), a multi-chip package (MCP), a chip-on-board (COB), a wafer-level fabricated package (WFP), and a wafer-level processed stack package (WSP).

Figure 8:
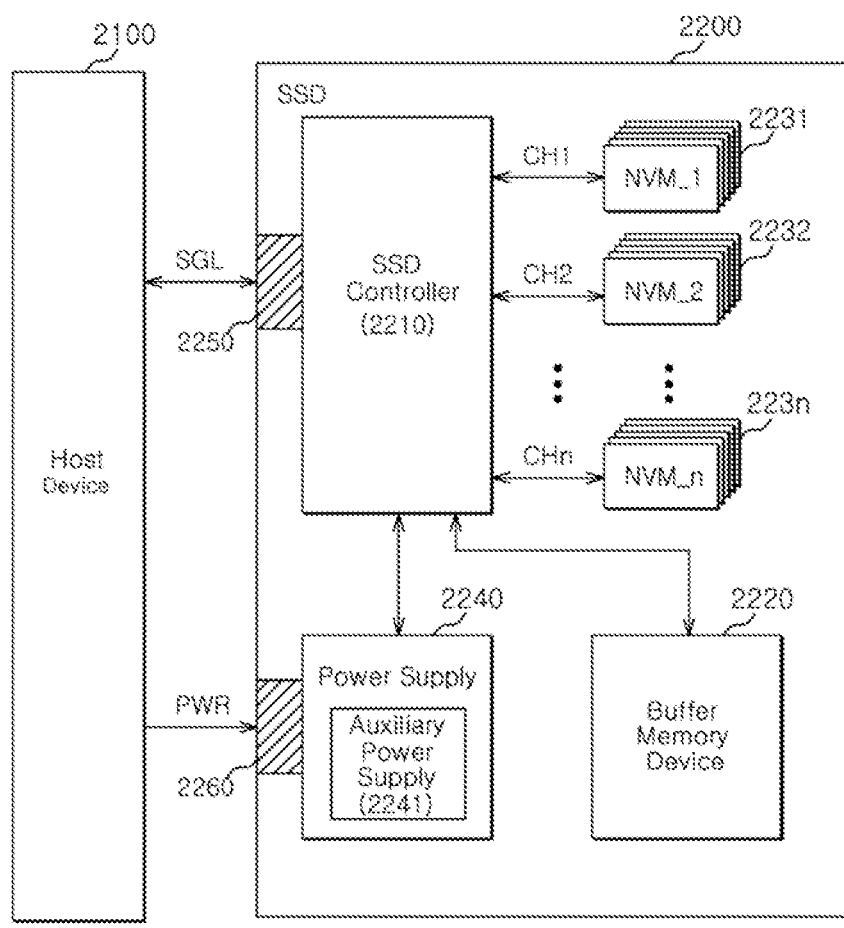
FIG. 8 is a block diagram illustrating a solid state drive (SSD) in accordance with an embodiment of the present disclosure.

FIG. 8 is a block diagram illustrating a solid state drive (SSD) in accordance with an embodiment of the present disclosure. Referring to FIG. 8, a data processing system 2000 may include a host device 2100 and an SSD 2200.

The SSD 2200 may include an SSD controller 2210, a buffer memory device 2220, nonvolatile memory devices 2231 to 223n, a power supply 2240, a signal connector 2250, and a power connector 2260.

The SSD 2200 may operate in response to a request from the host device 2100. That is to say, the SSD controller 2210 may access the nonvolatile memory devices 2231 to 223n in response to a request from the host device 2100. For example, the SSD controller 2210 may control the read, program, and erase operations of the nonvolatile memory devices 2231 to 223n.

The buffer memory device 2220 may temporarily store data which are to be stored in the nonvolatile memory devices 2231 to 223n. Further, the buffer memory device 2220 may temporarily store data which are read from the nonvolatile memory devices 2231 to 223n. The data temporarily stored in the buffer memory device 2220 may be transmitted to the host device 2100 or the nonvolatile memory devices 2231 to 223n under the control of the SSD controller 2210. Also, the buffer memory device 2220 may operate as the working memory device of the SSD controller 2210.

The SSD controller 2210 may vary the size of the regions (a system region and a buffer region although not shown) of the buffer memory device 2220 according to the attribute of the data requested (for example, read-requested and write-requested) from the host device 2100. For instance, in the case where the host device 2100 requests sequential data, the SSD controller 2210 may decrease the size of the system region and may increase the size of the buffer region. For another instance, in the case where the host device 2100 requests random data, the SSD controller 2210 may increase the size of the system region and may decrease the size of the buffer region.

The nonvolatile memory devices 2231 to 223n may be used as storage media of the SSD 2200. The nonvolatile memory devices 2231 to 223n may be electrically coupled to the SSD controller 2210 through a plurality of channels CH1 to CHn, respectively. One or more nonvolatile memory devices may be electrically coupled to one channel. The nonvolatile memory devices electrically coupled to one channel may be electrically coupled to the same signal bus and data bus.

The power supply 2240 may provide power PWR inputted through the power connector 2260, to the inside of the SSD 2200. The power supply 2240 may include an auxiliary power supply 2241. The auxiliary power supply 2241 may supply power to allow the SSD 2200 to be normally terminated when a sudden power-off occurs. The auxiliary power supply 2241 may include super capacitors capable of being charged with power PWR.

The SSD controller 2210 may exchange a signal SGL with the host device 2100 through the signal connector 2250. The signal SGL may include a command, an address, data, and so forth. The signal connector 2250 may by constituted by a connector such as of parallel advanced technology attachment (PATA), serial advanced technology attachment (SATA), small computer system interface (SCSI), serial attached SCSI (SAS), peripheral component interconnection (PCI), PCI express (PCI-E) protocols, according to an interface scheme between the host device 2100 and the SSD 2200.

Figure 9:
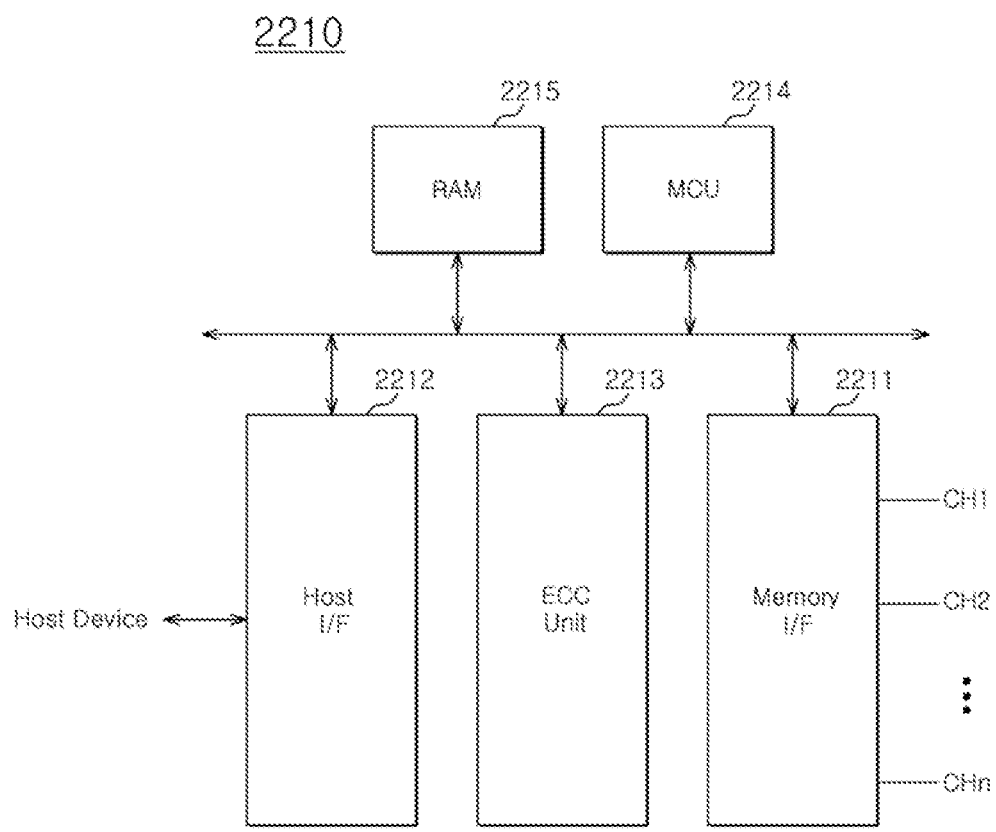
FIG. 9 is a block diagram illustrating an SSD controller shown in FIG. 8.

FIG. 9 is a block diagram illustrating the SSD controller shown in FIG. 8. Referring to FIG. 9, the SSD controller 2210 may include a memory interface 2211, a host interface 2212, an ECC unit 2213, a micro control unit 2214, and a RAM 2215.

The memory interface 2211 may provide a command and an address to the nonvolatile memory devices 2231 to 223n. Moreover, the memory interface 2211 may exchange data with the nonvolatile memory devices 2231 to 223n. The memory interface 2211 may scatter the data transmitted from the buffer memory device 2220 to the respective channels CH1 to CHn, under the control of the micro control unit 2214. Furthermore, the memory interface 2211 may transfer the data read from the nonvolatile memory devices 2231 to 223n to the buffer memory device 2220, under the control of the micro control unit 2214.

The host interface 2212 may provide an interface with the SSD 2200 in correspondence to the protocol of the host device 2100. For example, the host interface 2212 may communicate with the host device 2100 through one of parallel advanced technology attachment (PATA), serial advanced technology attachment (SATA), small computer system interface (SCSI), serial attached SCSI (SAS), peripheral component interconnection (PCI), and PCI express (PCI-E) protocols. In addition, the host interface 2212 may perform a disk emulating function of supporting the host device 2100 to recognize the SSD 2200 as a hard disk drive (HDD).

The ECC unit 2213 may generate parity bits based on the data transmitted to the nonvolatile memory devices 2231 to 223n. The generated parity bits may be stored in spare areas of the nonvolatile memory devices 2231 to 223n. The ECC unit 2213 may detect an error of the data read from the nonvolatile memory devices 2231 to 223n. When the detected error falls within a correctable range, the ECC unit 2213 may correct the detected error.

The micro control unit 2214 may analyze and process a signal SGL inputted from the host device 2100. The micro control unit 2214 may control the general operations of the SSD controller 2210 in response to a request from the host device 2100. The micro control unit 2214 may control the operations of the buffer memory device 2220 and the nonvolatile memory devices 2231 to 223n according to a firmware for driving the SSD 2200. The RAM 2215 may be used as a working memory device for driving the firmware.

Figure 10:
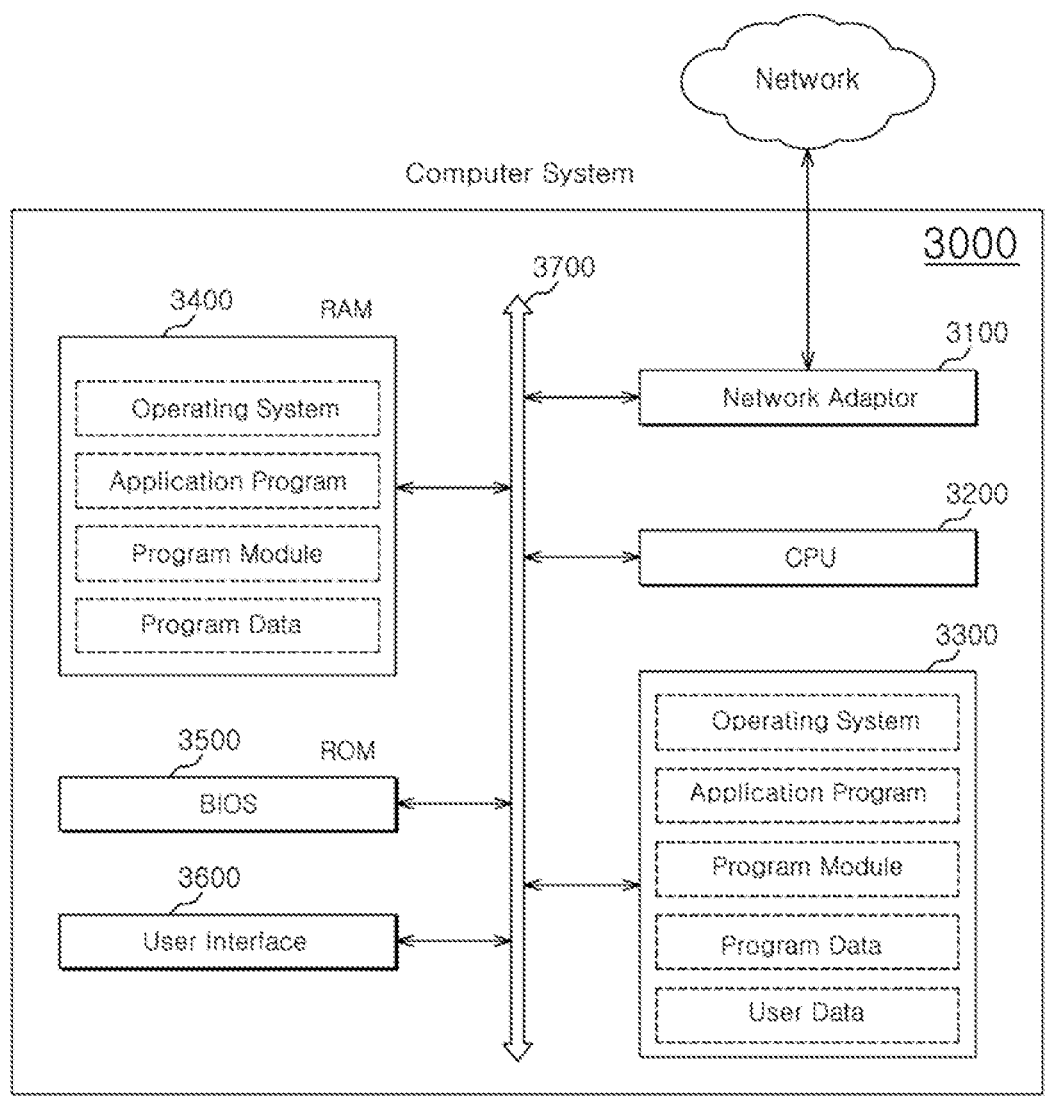
FIG. 10 is a block diagram illustrating a computer system in accordance with the embodiment of the present disclosure.

FIG. 10 is a block diagram illustrating a computer system in which the data storage device in accordance with the embodiment of the present disclosure is mounted. Referring to FIG. 10, a computer system 3000 includes a network adaptor 3100, a central processing unit 3200, a data storage device 3300, a RAM 3400, a ROM 3500, and a user interface 3600, which are electrically coupled to a system bus 3700. The data storage device 3300 may be constituted by the data storage device 120 shown in FIG. 1, the data storage device 220 shown in FIG. 6, the data storage device 1200 shown in FIG. 7, or the SSD 2200 shown in FIG. 8.

The network adaptor 3100 provides interfacing between the computer system 3000 and external networks. The central processing unit 3200 performs general operations for driving an operating system residing at the RAM 3400 or an application program.

The data storage device 3300 stores general data necessary in the computer system 3000. For example, an operating system for driving the computer system 3000, an application program, various program modules, program data and user data are stored in the data storage device 3300.

The RAM 3400 may be used as a working memory device of the computer system 3000. Upon booting, the operating system, the application program, the various program modules, and the program data necessary for driving programs, which are read from the data storage device 3300, are loaded on the RAM 3400. A BIOS (basic input/output system), which is activated before the operating system is driven, is stored in the ROM 3500. Information exchange between the computer system 3000 and a user is implemented through the user interface 3600.

Although not shown in a drawing, it is to be readily understood that the computer system 3000 may further include devices such as an application chipset, a camera image processor (CIS), and so forth.

While certain embodiments have been described above, it will be understood to those skilled in the art that the embodiments described are by way of example only. Accordingly, the data storage device described herein should not be limited based on the described embodiments. Rather, the data storage device described herein should only be limited in light of the claims that follow.

What is claimed is:

1. A data storage device comprising:
   a first memory device;
   a second memory device including a system region and a buffer region; and a controller suitable for controlling the first memory device in response to a request from a host device, cumulatively managing a number of sequential data requests and a number of non-sequential data requests as an attribute of data, and allocating the system region and the buffer region according to the cumulatively managed attribute of data.

2. The data storage device according to claim 1, wherein the controller is suitable for allocating the buffer region to be larger than the system region when the number of the sequential data requests is larger than or equal to the number of the non-sequential data requests plus a predetermined weighting value.

3. The data storage device according to claim 2, wherein the controller is suitable for setting the predetermined weighting value to be small to allocate more for the buffer region than the system region.

4. The data storage device according to claim 1, wherein the controller is suitable for allocating the system region to be larger than the buffer region when the number of the non-sequential data requests is larger than or equal to the number of the sequential data requests and a predetermined weighting value.

5. The data storage device according to claim 4, wherein the controller is suitable for setting the predetermined weighting value to be small to allocate more for the system region than the buffer region.

6. The data storage device according to claim 1, wherein the second memory device is included in the controller.

\* \* \* \* \*